(12) United States Patent
Peacock

(10) Patent No.: US 6,850,986 B1
(45) Date of Patent: Feb. 1, 2005

(54) METHOD AND SYSTEM FOR IMPLEMENTING URL SCHEME PROXIES ON A COMPUTER SYSTEM

(75) Inventor: Gavin Peacock, Walnut Creek, CA (US)

(73) Assignee: Palm Source, Inc., Sunnyvale, CA (US)

( * ) Notice: Subject to any disclaimer, the term of this patent is extended or adjusted under 35 U.S.C. 154(b) by 761 days.

(21) Appl. No.: 09/814,530

(22) Filed: Mar. 21, 2001

(51) Int. Cl.[7] .............................. G06F 15/16; H04J 3/16
(52) U.S. Cl. ........................ 709/232; 709/202; 370/466
(58) Field of Search ....................... 455/422.1; 709/228, 709/202, 232; 370/349, 466

(56) References Cited

U.S. PATENT DOCUMENTS

| | | | | |
|---|---|---|---|---|
| 6,038,603 A | * | 3/2000 | Joseph | 709/228 |
| 6,678,518 B2 | * | 1/2004 | Eerola | 455/422.1 |
| 2002/0101848 A1 | * | 8/2002 | Lee et al. | 370/349 |
| 2003/0203732 A1 | * | 10/2003 | Eerola | 455/422.1 |

FOREIGN PATENT DOCUMENTS

| | | | | |
|---|---|---|---|---|
| EP | 1091607 A2 | * | 4/2001 | H04Q/7/32 |

* cited by examiner

Primary Examiner—William A. Cuchlinski, Jr.
Assistant Examiner—M. Delgado
(74) Attorney, Agent, or Firm—Wagner, Murabito, & Hao LLP

(57) ABSTRACT

A method and system for implementing URL scheme proxies. Embodiments of the invention allow URL schemes that are not natively supported by a computer to be supported via proxy, e.g., using a URL scheme that is native to the computer to forward the non-native transport. More specifically, embodiments of the invention allow a first computer system to support a first URL scheme by encapsulating its transport information into another URL scheme that is natively supported by the first computer. The encapsulated information is then forwarded to a second computer system or server which can provide support for the first URL scheme transport. For instance, if the first computer supports http but does not support ftp, then an ftp transport can be encapsulated inside an http transport and then forwarded to an ftp server which can then extract and process the ftp transport. The ftp response can be handled in an analogous fashion. The invention increases the native URL scheme capabilities of a computer system by proxy. In one embodiment, a system registry is used in order to determine which helper code to use for a particular URL scheme. The selection of helper code and whether native or proxy support is selected are tasks that are transparent to the application. The invention can allow a device with no Internet access to act, transparently, as if it has Internet access.

22 Claims, 16 Drawing Sheets

410a

| URL SCHEME | CODE IDENTIFIER | |
|---|---|---|
| HOT SYNC | HELPER CODE HOTSYNC | 440a |
| INFRARED (IR) | HELPER CODE IR | 440b |
| BLUETOOTH (BT) | HELPER CODE BT | 440c |
| HTTP | HELPER CODE HTTP | 440d |
| FTP | HELPER CODE HTTP | 440e |
| SMS | HELPER CODE SMS | 440f |
| EMAIL | HELPER CODE EMAIL | 440g |

| URL SCHEME | CODE IDENTIFIER | |
|---|---|---|
| HOT SYNC | HELPER CODE HOTSYNC | ← 440a |
| INFRARED (IR) | HELPER CODE IR | ← 440b |
| BLUETOOTH (BT) | HELPER CODE BT | ← 440c |
| HTTP | HELPER CODE HOTSYNC | ← 440d |
| FTP | HELPER CODE HOTSYNC | ← 440e |
| SMS | HELPER CODE SMS | ← 440f |
| EMAIL | HELPER CODE EMAIL | ← 440g |

| URL SCHEME | CODE IDENTIFIER | |
|---|---|---|
| HOT SYNC | HELPER CODE HOTSYNC | — 440a |
| INFRARED (IR) | HELPER CODE IR | — 440b |
| BLUETOOTH (BT) | HELPER CODE BT | — 440c |
| HTTP | HELPER CODE SMS | — 440d |
| FTP | HELPER CODE HTTP | — 440e |
| SMS | HELPER CODE SMS | — 440f |
| EMAIL | HELPER CODE SMS | — 440g |

| URL SCHEME | CODE IDENTIFIER | |
|---|---|---|
| HOT SYNC | HELPER CODE HOTSYNC | 440a |
| INFRARED (IR) | HELPER CODE IR | 440b |
| BLUETOOTH (BT) | HELPER CODE BT | 440c |
| HTTP | HELPER CODE IR | 440d |
| FTP | HELPER CODE FTP | 440e |
| SMS | HELPER CODE SMS | 440f |
| EMAIL | HELPER CODE HOTSYNC | 440g |

METHOD AND SYSTEM FOR IMPLEMENTING URL SCHEME PROXIES ON A COMPUTER SYSTEM

BACKGROUND OF THE INVENTION

1. Field of the Invention

The present invention relates to the field of electronic communication and data processing. More specifically, embodiments of the present invention relate to expanding communication schemes natively supported by a computer system.

2. Related Art

As the components required to build a computer system have reduced in size, new categories of portable electronic devices and computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, datebook, etc.) and electronic notepads, to name a few. Palmtop computers with PIM software have been know as Personal Digital Assistants (PDAs). Many PDAs have a small and flat display screen associated therewith. Moreover, PDAs and cell phones are being integrated together resulting in a single intelligent device that provides wireless communication capability.

User convenience and device value are very important factors for portable electronic devices and systems that may include portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the users everyday activities. Similarly, the more useful the device, the more the device will be used and acquired.

The rapid penetration of portable electronic devices into the home and business markets has augmented, not replaced, the usefulness of desktop, laptop and server computer systems. As a result, it is not uncommon for a single user to have a portable electronic device which may be connected to one or more other computer systems and/or servers, e.g., by wireless connections or over the Internet.

A scheme in a URL (Uniform Resource Locator) is the part that specifies the type of URL data that follows thereby specifying a particular transport mechanism to use for the communication. The scheme is separated from the rest of the URL by a colon. A program, such as a web browser software application, that handles the URL format will look for a scheme at the start of a URL. If the web browser software application knows how to handle that scheme, it will pass the rest of the URL off to some other routine that knows how to handle that particular scheme. The other routine then performs the transport.

Typical schemes are "http:" and "ftp:". If an application running on a device does not recognize a particular scheme, it may allow other computer-resident "helper applications" which are registered with the application to handle other schemes. In this case, the device is providing native support for the ftp, it is just using another device-resident helper application, besides the first application, to process it. As an example, a browser application could allow an ftp program to be registered to handle the "ftp:" scheme. However, this prior art approach requires that the ftp program must already be loaded on the device and be registered with the browser application. In effect, this prior art approach merely provides device-native support for the URL schemes.

A robust Internet application, developed in view of the device-native prior art approach above, should be able to handle most of the URLs it receives. This requires that support for all URL schemes must be available within the application or natively via registered helpers on the device. However, hand-held devices have limited storage and limited network access capabilities. This complicates the process of keeping them updated with all the appropriate helper applications. The memory and processing resource constraints placed on hand-held devices make the above "device-native" approach an unsatisfactory solution to the problem of expanding the URL scheme processing capabilities of hand-held devices.

In addition, wireless network access is also more expensive than desktop access, so a user way want to use a desktop network solution even if the device can support the scheme natively. It would be advantageous to provide a solution that addresses the above concern.

SUMMARY OF THE INVENTION

Accordingly, what is needed is a method and system for expanding the URL scheme processing capabilities of a computer system. What is needed further is a method and system for expanding the URL scheme processing capabilities of a hand-held computer system. What is yet needed is a method and system for expanding the URL scheme processing capabilities of a hand-held computer system that efficiently utilizes the constrained memory and processing resources of typical hand-held computer systems. What is further needed is a method and system that provides native and non-native support for URL schemes such as http, ftp, email, and others, for a hand-held computer system. It is appreciated that embodiments of the present invention provide the above advantages and others not specifically mentioned above but described in the sections to follow.

A method and system are described herein for implementing URL scheme proxies. Embodiments of the invention allow URL schemes that are not natively supported by a computer to be supported via proxy, e.g., using a URL scheme that is native to the computer to forward the non-native transport. More specifically, embodiments of the invention allow a first computer system to support a first URL scheme by encapsulating its transport information into another URL scheme that is natively supported by the first computer. The encapsulated information is then forwarded to a second computer system or server which can provide support for the first URL scheme transport.

For instance, if the first computer supports http but does not support ftp, then an ftp transport can be encapsulated inside an http transport and then forwarded to an ftp server which can then extract and process the ftp transport. The ftp response can be handled in an analogous fashion. The invention increases the native URL scheme capabilities of a computer system by proxy. In one embodiment, a system registry is used in order to determine which helper code to use for a particular URL scheme. The selection of helper code and whether native or proxy support is selected are tasks that are transparent to the application. The invention can allow a device with no Internet access to act, transparently, as if it has Internet access.

More specifically, an embodiment of the present invention includes a computer system having a processor and a memory unit and comprising: a memory resident system registry having registered therein information regarding a plurality of URL schemes and associated helper code for implementing URL schemes and wherein a first URL scheme is natively implemented and wherein a second URL scheme is implemented by proxy, the proxy being the first URL scheme; an application for requesting a communication of the second URL scheme; and a system task for indexing the system registry in response to the request and for determining that the first URL scheme is a proxy for the second URL scheme; the system task also for encapsulating the communication of the second URL scheme into a proxy communication of the first URL scheme; and the system task also for forwarding the proxy communication to a second device that natively implements the second URL scheme.

Embodiments also include the above and wherein the second device is for receiving and unpacking the proxy communication to obtain the communication of the second URL scheme; the second device for processing the communication; and the second device for generating a response to the first device, the response being encapsulated into a communication of the first URL scheme.

Embodiments include the above and wherein the first device is a personal digital assistant or wherein the second device is a web hosted server or wherein the first URL scheme is a hot sync scheme or wherein the second URL scheme is an http scheme or wherein the second URL scheme is an email scheme.

BRIEF DESCRIPTION OF THE DRAWINGS

FIG. 7B is a data diagram of an exemplary system registry corresponding to the implementation of FIG. 7A.

FIG. 8B is a data diagram of an exemplary system registry corresponding to the implementation of FIG. 8A.

FIG. 9B is a data diagram of an exemplary system registry corresponding to the implementation of FIG. 9A.

FIG. 10B is a data diagram of an exemplary system registry corresponding to the implementation of FIG. 10A.

DETAILED DESCRIPTION OF THE INVENTION

Figure 1:
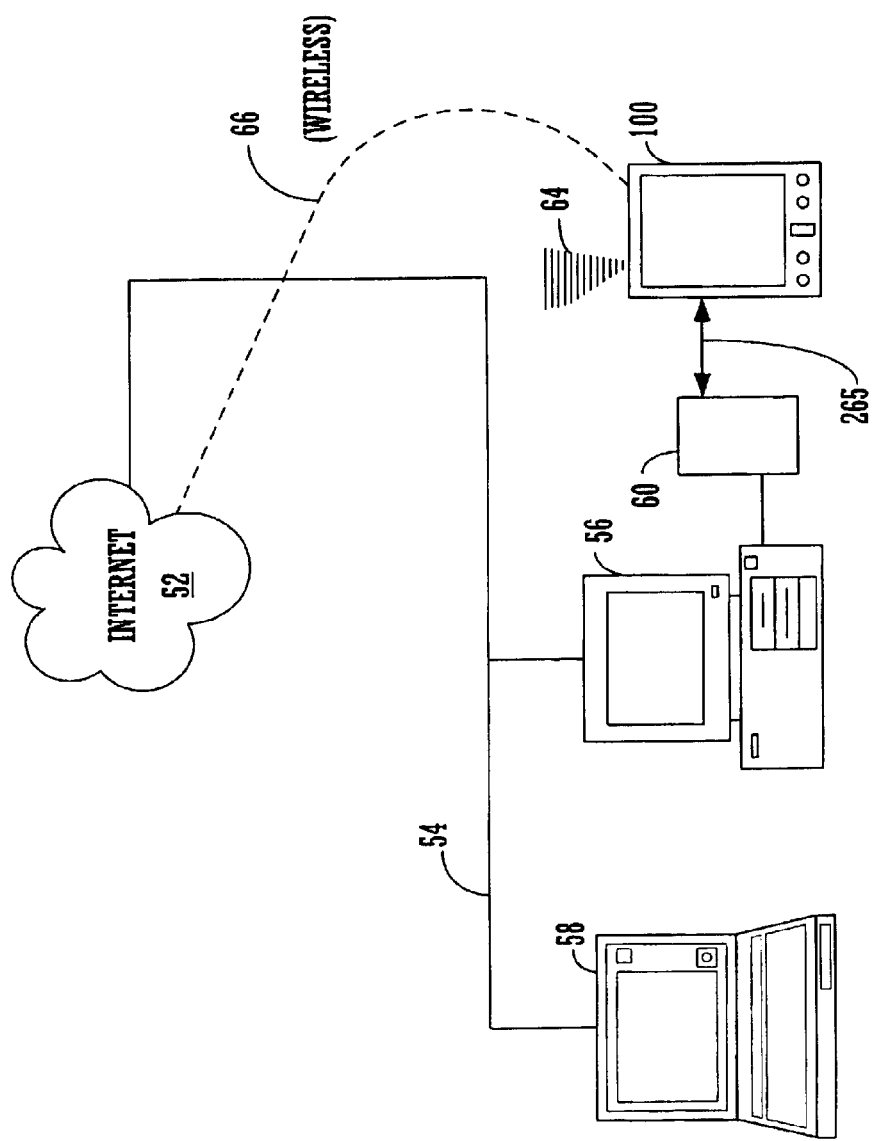
FIG. 1 is system illustration of a palmtop or "palm sized" computer system connected to other computer systems and the Internet.

In the following detailed description of the present invention, a method and system for expanding the URL schemes supported by a computer using URL scheme proxies, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow (e.g., process 600) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "accessing" or "processing" or "computing" or "suspending" or "resuming" or "translating" or "calculating" or "determining" or "scrolling" or "displaying" or "recognizing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The processes of the present invention described herein are applicable to communication between electronic devices which may include computer systems, portable computer systems, cell phones, pagers, etc. Some portable computer systems called personal digital assistants (PDAs) are handheld. Although applicable across a wide variety of platforms and devices, an embodiment of the present invention is described herein by example with respect to an exemplary portable or mobile computer system, e.g., a PDA.

FIG. 1 illustrates an exemplary networked system 50 that can be used in conjunction with an embodiment of the present invention. System 50 is exemplary only and comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 (or a separate communication channel) can provide communication with the Internet 52 using a number of well known protocols.

Importantly, a communication link is also coupled to a cradle 60 (or cable dock) for receiving and initiating communication with an exemplary palmtop ("palm-sized") portable computer system 100 over line 265. Cradle 60 provides an electrical and mechanical communication interface between the computer system 100 for two way communications. In one embodiment, the communication link including cradle 60 and line 265 is a serial communication link or can be a USB link. Computer system 100 may also contain a wireless infrared communication mechanism 64 for sending and receiving information to or from other devices. As discussed more fully below, computer system 100 also contains one or more other wireless communication mechanisms, e.g., cellular phone, Bluetooth and/or wireless LAN (e.g., IEEE 802.11), for instance, all of which can be used to establish the communication link between the portable computer system 100 and the host computer system or with the Internet directly 66.

Figure 2A:
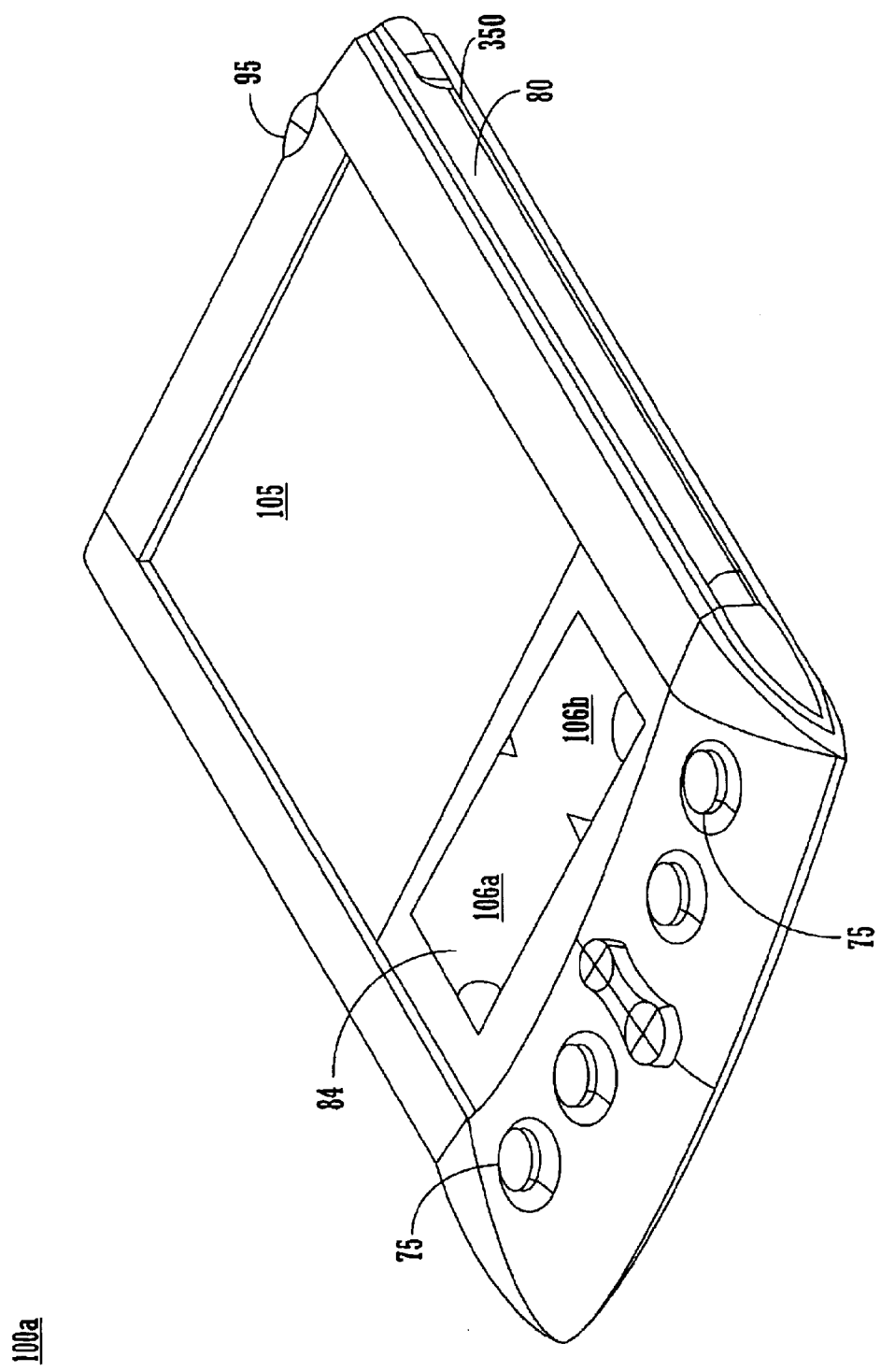
FIG. 2A is a top side perspective view of an exemplary portable, e.g., palmtop, computer system.

FIG. 2A is a perspective illustration of the top face 100a of one embodiment of the palmtop computer system. The top face 110a contains a display screen 105 surrounded by a bezel or cover. A removable stylus 80 is also shown. The display screen 105 contains a transparent touch screen (digitizer) able to register contact between the screen and the tip of the stylus 80. The stylus 80 can be of any material to make contact with the screen 105. As shown in FIG. 2A, the stylus 80 is inserted into a receiving slot or rail 350. Slot or rail 350 acts to hold the stylus when the computer system 100a is not in use. Slot or rail 350 may contain switching devices for automatically powering down and automatically power up computer system 100a based on the position of the stylus 80. The top face 100a also contains one or more dedicated and/or programmable buttons 75 for selecting information and causing the computer system to implement functions. Other buttons (icons) can be implemented within a silk screen layer material 84 on which regions 106a and 106b reside. An exemplary on/off button 95 is also shown.

FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 6:
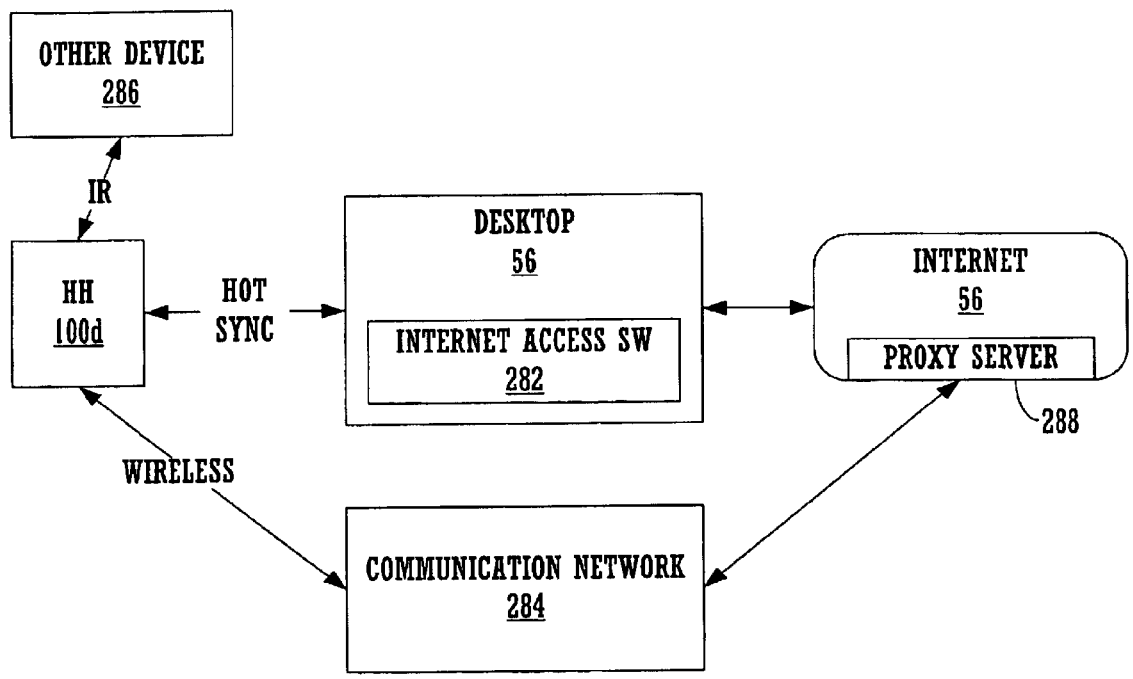
FIG. 6 illustrates an exemplary communication system in which embodiments of the present invention may be practiced.

The digitizer 160 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 6). In one implementation, there are roughly 256 different discrete levels of pressure that can be detected by the digitizer 106. Since the digitizers channels are sampled serially by the processor, the stroke spatial data are sampled "pseudo" simultaneously with the associated pressure data. The sampled data is then stored in a memory by the processor 101 (FIG. 6) for later analysis.

Figure 2B:
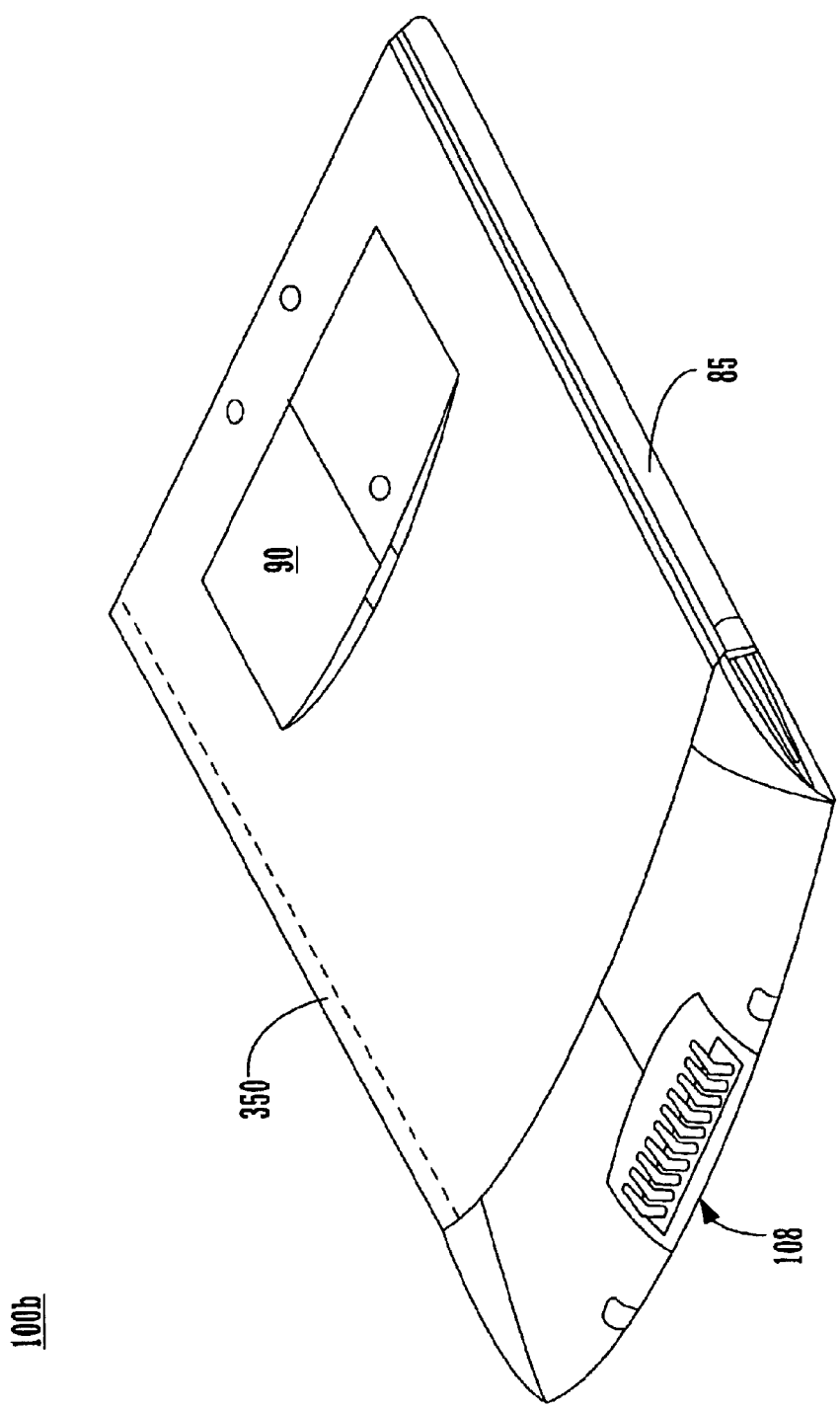
FIG. 2B is a bottom side perspective view of the exemplary portable, e.g., palmtop, computer system of FIG. 3A.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350.

Figure 3:
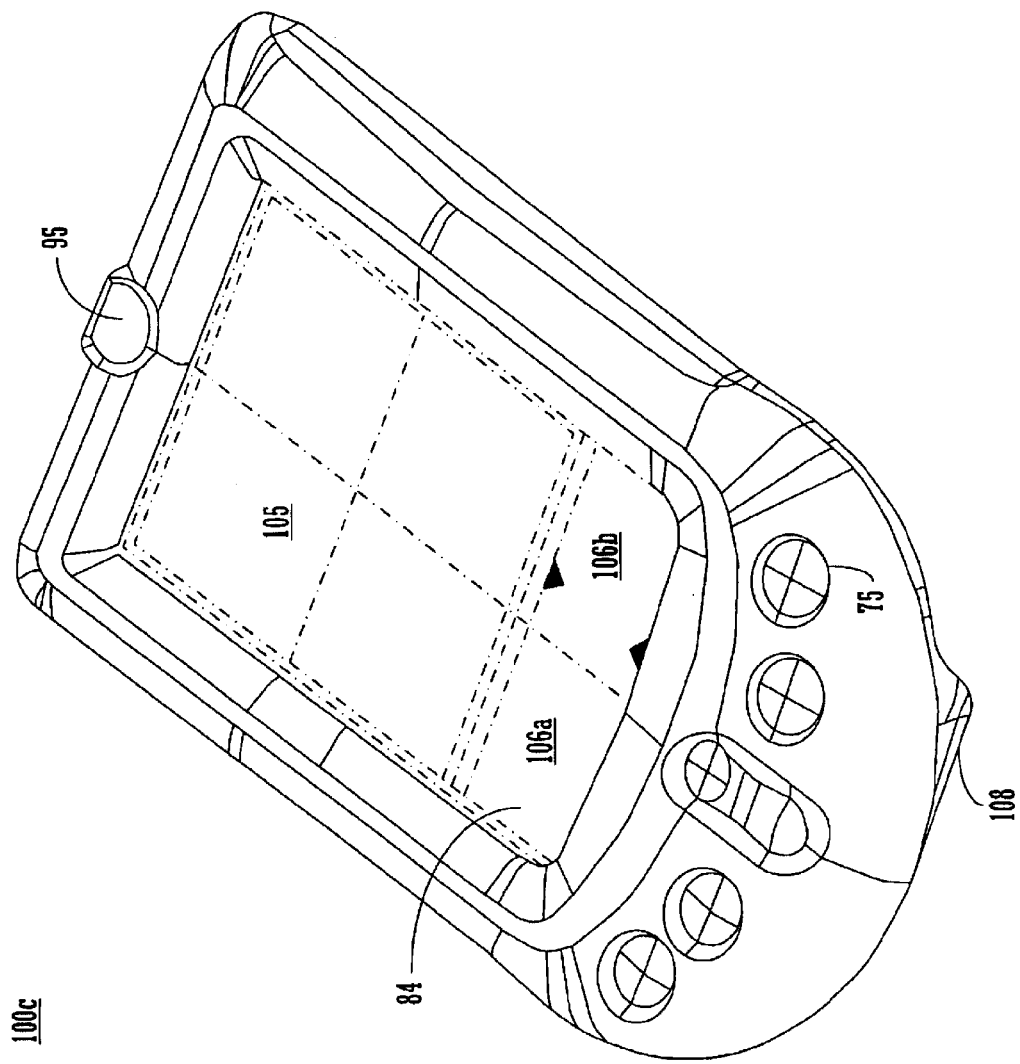
FIG. 3 is a perspective top view of another embodiment of the exemplary portable, e.g., palmtop, computer system.

FIG. 3 illustrates a front perspective view of another implementation 100c of the palmtop computer system. As shown, the flat central area is composed of a display screen area 105 and a thin silk screen layer material portion 84. Typically, the silk screen layer material portion 84 is opaque and may contain icons, buttons, images, etc., graphically printed thereon in addition to regions 106a and 106b. The display screen area 105 and portion 84 are disposed over a digitizer.

Figure 4:
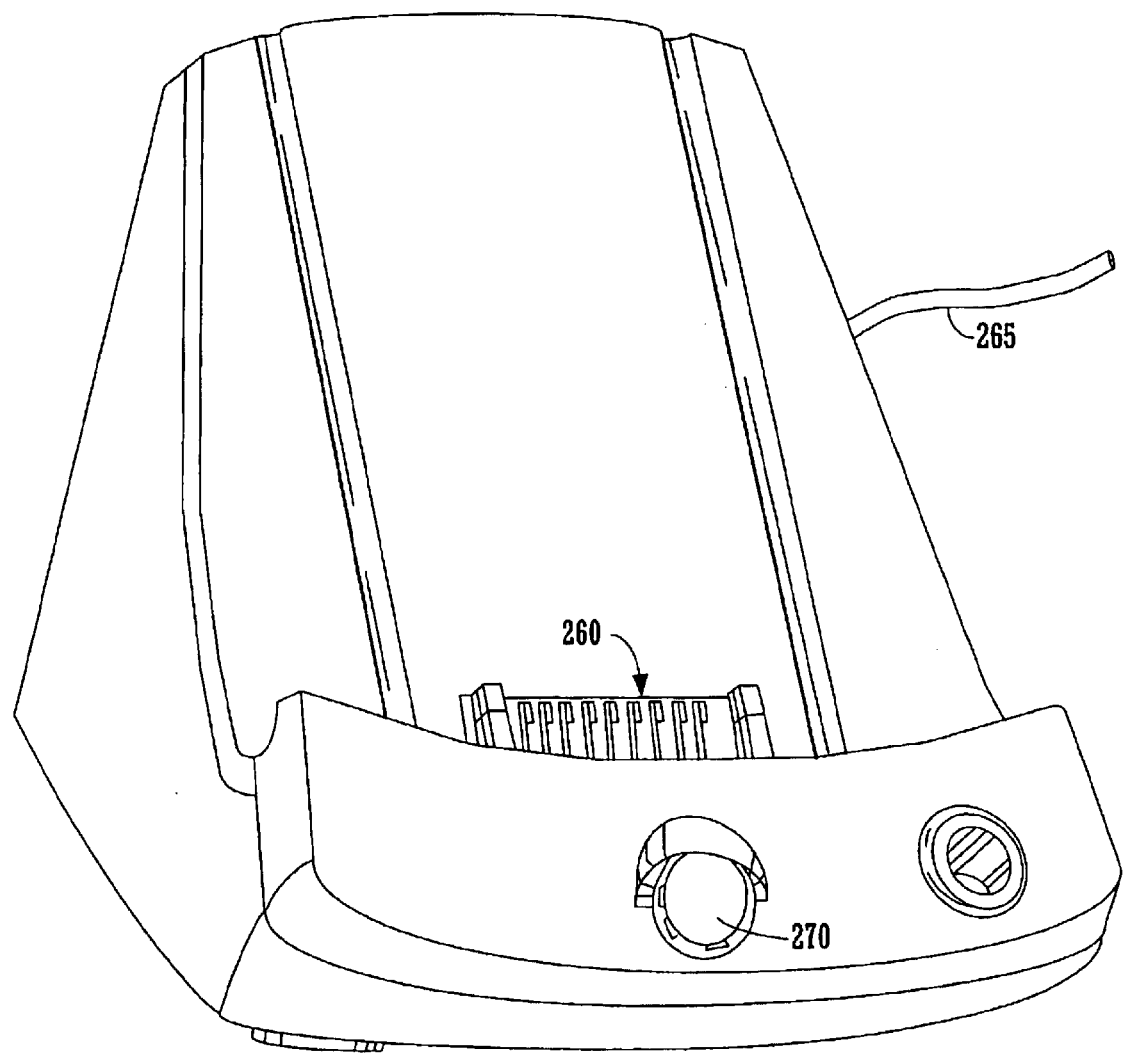
FIG. 4 is a perspective view of a cradle device for connecting a portable, e.g., palmtop, computer system to other systems via a communication interface.

FIG. 4 is a perspective illustration of one embodiment of the cradle 60 for receiving the palmtop computer system 100. In other embodiments, cradle 60 is not a stand-up device but is rather part of a cable connection between the palmtop computer system 100 and the desk top unit. Cradle 60 contains a mechanical and electrical interface 260 for interfacing with serial connection 108 (FIG. 3B) of computer system 100 when system 100 is slid into the cradle 60 in an upright position. Alternatively, a USB connection could be used. Once inserted, button 270 may be pressed to initiate two way communication between system 100 and other computer systems coupled to serial communication 265.

Figure 5:
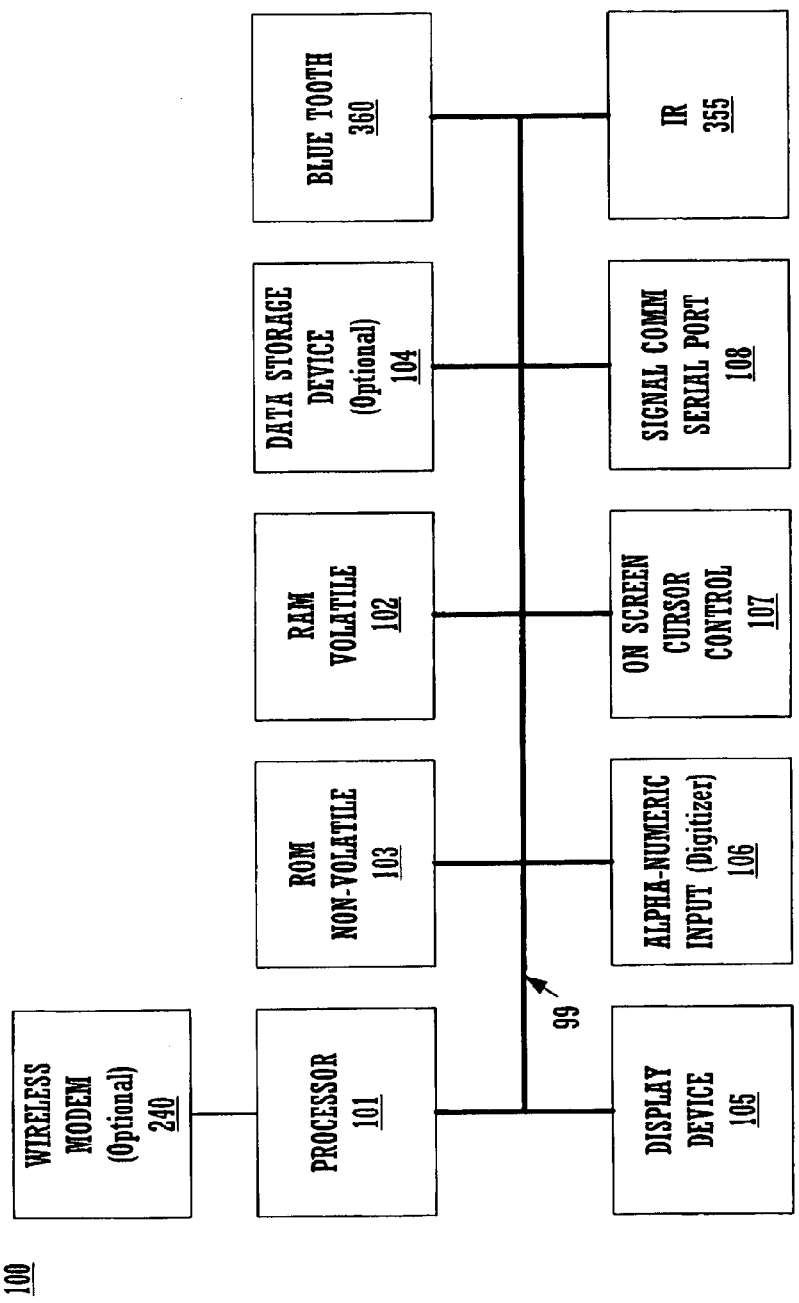
FIG. 5 is a logical block diagram of an exemplary portable, e.g., palmtop, computer system in accordance with an embodiment of the present invention.

FIG. 5 illustrates exemplary circuitry of portable computer system 100. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., thin profile removable memory) coupled with the bus 99 for storing information and instructions. Device 104 can be removable. As described above, system 100 also contains a display device 105 coupled to the bus 99 for displaying information to the computer user.

Also included in computer system 100 of FIG. 5 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101.

System 110 also includes an optional cursor control or directing device 107 coupled to the bus for communicating user input information and command selections to the central processor 101. In one implementation, device 107 is a touch screen device (also a digitizer) incorporated with screen 105. Device 107 is capable of registering a position on the screen 105 where the stylus makes contact and the pressure of the contact. The digitizer can be implemented using well known devices, for instance, using the ADS-7846 device by Burr-Brown that provides separate channels for spatial stroke information and pressure information.

The display device 105 utilized with the computer system 100 may be a liquid crystal device, cathode ray tube (CRT), field emission device (FED, also called flat panel CRT) or other display device suitable for creating graphic images and alphanumeric characters recognizable to the user. Any of a number of display technologies can be used, e.g., LCD, FED, plasma, etc., for the flat panel display 105. In one embodiment, the display 105 is a flat panel multi-mode display capable of both monochrome and color display modes.

Signal communication device 108, also coupled to bus 99, can be a serial port (or USB port) for communicating with the cradle 60. In addition to device 108, wireless communication links can be established between the device 100 and a host computer system (or another portable computer system) using a Bluetooth wireless device 360, an infrared device 355, or a GSM radio device 240. Device 100 may also include a wireless modem device 240 and/or a wireless radio, e.g., a GSM wireless radio with supporting chipset. The wireless modem device 240 is coupled to communicate with the processor 101 but may not be directly coupled to port 108.

In one implementation, the Mobitex wireless communication system may be used to provide two way communication between system 100 and other networked computers and/or the Internet via a proxy server. In other embodiments, TCP protocol can be used or SMS (Short Message Service) can be used. System 100 of FIG. 5 may also contain batteries for providing electrical power. Replaceable cells or rechargeable batteries can be used. Well known electronics may be coupled to the battery to detect its energy level and this information can be sampled by the processor 101.

URL Scheme Proxies in Accordance with the Present Invention

FIG. 6 illustrates an exemplary system 280 in which embodiments of the present invention may be performed. System 280 includes a portable computer system 100d, a second computer system or other electronic device 286, a desktop computer system 56 and a wireless communication network 284, e.g., a bluetooth piconet. System 280 also contains a connection to the Internet 56 and a proxy server 288 located on the Internet. The portable computer system 100d synchronizes with the desktop computer 56 so that databases maintained on the systems share the same information. The general process and results achieved through synchronization, e.g., "hot sync" are described in more detail in the following: U.S. Pat. No. 5,727,202 issued Mar. 10, 1998 by Kucala; U.S. Pat. No. 6,000,000 issued Dec. 7, 1999 by Hawkins et al.; U.S. Pat. No. 5,832,489 issued Nov. 3, 1998 by Kucala; U.S. Pat. No. 5,884,232 issued Mar. 16, 1999 by Hawkins et al.; and U.S. Pat. No. 6,006,274 issued Dec. 21, 1999 by Hawkins et al., all of which are hereby incorporated herein by reference.

In the example of FIG. 6, the portable computer system 100d can communicate with the other system 286 via a wireless infrared (IR) communication link. Also, via a wireless bluetooth communication link, the portable computer system 100d can communicate with the wireless network 284 which is in communication with the Internet 56 via a proxy server 288. The desktop computer 56 also provides Internet access via its Internet access software 282, e.g., a web browser application. It is appreciated that embodiments of the present invention do not require all of the components illustrated in FIG. 6. System 280 is merely exemplary of the embodiments of the present invention described further below.

Figure 7A:
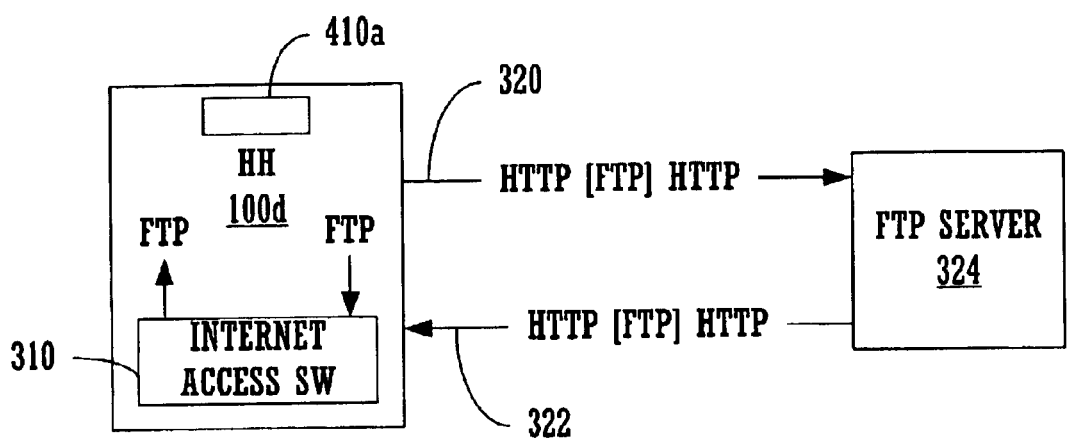
FIG. 7A is an illustration of one implementation of the present invention having an ftp transport encapsulated using a native http transport mechanism.

FIG. 7A and FIG. 7B illustrate an example of the URL scheme proxy functionality of the present invention. Embodiments of the present invention provide URL scheme functionality to a device that the device may not possess natively. The extended functionality is provided by "proxy" in the form of forwarding the URL scheme communication to another device that can perform the communication natively. The process of forwarding the communication is performed transparently to the application running on the device and involves a system registry that is stored thereon.

With respect to FIG. 7A, assume the portable computer system 110d is connected, over the Internet, to an FTP server 324, as well as other HTTP services of the Internet. The connection to the Internet can be made wirelessly as shown in FIG. 6. Special Internet access software 310 installed on the portable computer system 100d is also used. In this example, assume that the portable computer system 100d, while supporting the HTTP scheme, does not support the FTP URL scheme.

FIG. 7B illustrates the corresponding system registry 410a that resides in memory in device 100d. The system registry 410a contains a plurality of supported URL schemes, column 420, and the corresponding helper code, column 430, that is used by the device 100d to implement the URL scheme. An identifier of the code can be stored in column 430. As shown in FIG. 7B, the following URL schemes are supported: hot sync, IR, BT (bluetooth), HTTP, FTP, SMS, and Email. The IR can be implemented using the IrOBEX standard. In this example of FIG. 7B, each of the URL schemes are supported natively, except for the ftp 440e. That is, code resides on the device 100a itself to fully implement each URL scheme, except for the ftp. In this case, the http code is used as a proxy for the ftp.

The present invention allows one URL scheme to proxy for another. So if device 100d supports http natively, but not ftp, device 100d can still support the FTP scheme via http, e.g., by proxy. In accordance with the present invention, the http helper code registers itself as supporting ftp. For instance, the http helper code is registered in entry 440e. This means that ftp URLs will be sent to the http code for processing in accordance with the present invention. The http code will then take the ftp URL, encapsulate it, and send it via http to some well know server service 324 (FIG. 7A). That service 324 would reside somewhere on the Internet and have the ability to support an FTP URL natively. As shown in FIG. 7A, the ftp communication is encapsulated "[ ]" within an http URL scheme and sent 320 to the ftp server 324.

The server 324 then extracts the ftp URL and processes it. The result 322 is then packaged in an http response and sent back to the calling device 100d. The calling device 100d then extracts the ftp response from the http response 322 and returns to the Internet application 310 with an ftp response. To the application, the entire process is transparent, e.g., it appears as if the ftp request was handled normally, e.g., natively. This allows a device 100d with support for only a simple set of protocols, natively, to act as if it supports much more via proxy.

Updates to the protocol can now be made on a central server instead of on each device. This simplifies the device 100d and improves support.

Figure 8A:
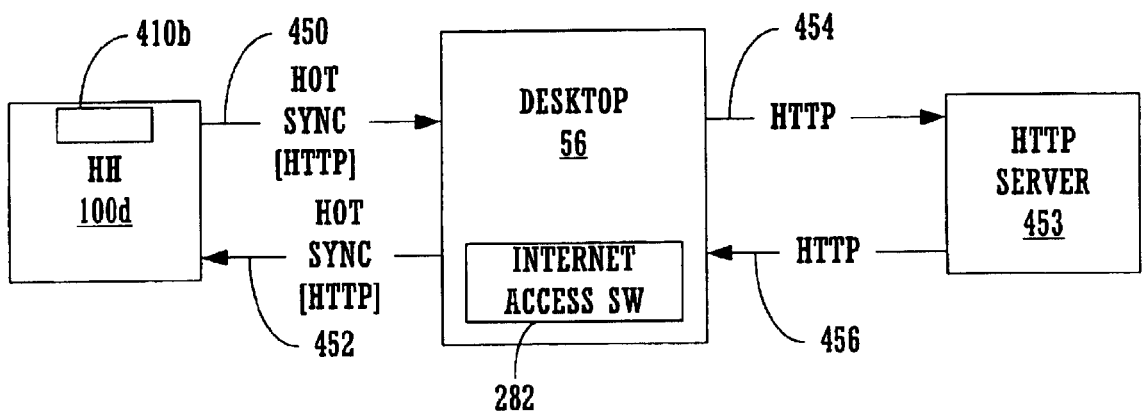
FIG. 8A is an illustration of an implementation of the present invention having an http transport encapsulated using a native hot sync transport mechanism.

One advantage of the URL scheme forwarding process of the present invention is that it can allow a device with no Internet access at all to act as if it has Internet access, as shown in the example of FIG. 8A and FIG. 8B. For instance, a standard palmtop device 100d with only IrOBEX or hotsync connectivity could support Internet connectivity via http and ftp URLs. This can be done by allowing the hotsync or IrDA scheme handler to register itself as supporting http and ftp.

Another advantage of the URL scheme forwarding process of the present invention is that even if the device natively supports Internet access, it may be preferable for the user to employ the proxy mechanism of the present invention for cost and/or performance reasons.

FIG. 8A and FIG. 8B utilize hotsync as an example. FIG. 8A illustrates a palmtop computer 100d coupled to the desktop 56 using a hotsync communication link 450/452. The desktop 56 is then connected to an http server 453 located on the Internet. As shown in FIG. 8B, the corresponding system registry 410b utilizes the hotsync helper code for both http 440d and also ftp 440e and also for hotsync itself 440a. This means that the hotsync programs will be used to process any URL request from an application residing on the device 100d that involves hotsync, http or ftp.

When an Internet application residing on the device 100d requests a URL such as "http://myserver.com/index.html," the request is then passed to a hotsync URL handler. Since the hotsync code does not have native support for an http request, it encapsulates this in a packet to be delivered to the desktop or server at the next synchronization, as shown in 450 of FIG. 8A. When the user next synchronizes their device, the request is sent to the desktop conduit. The conduit then examines the request and sees the http URL. The conduit will then process the http URL which may cause a communication to the http server 453. The desktop 56 then sends the results back to the device 100d, using pathway 452, encapsulated in another hotsync packet. On the device 100d, the encapsulated result is unwrapped and an http communication is returned to the calling application.

The result is that a device without http native support or web access was able to handle a standard HTTP URL request. The same process can be performed for ftp URL schemes.

Figure 9A:
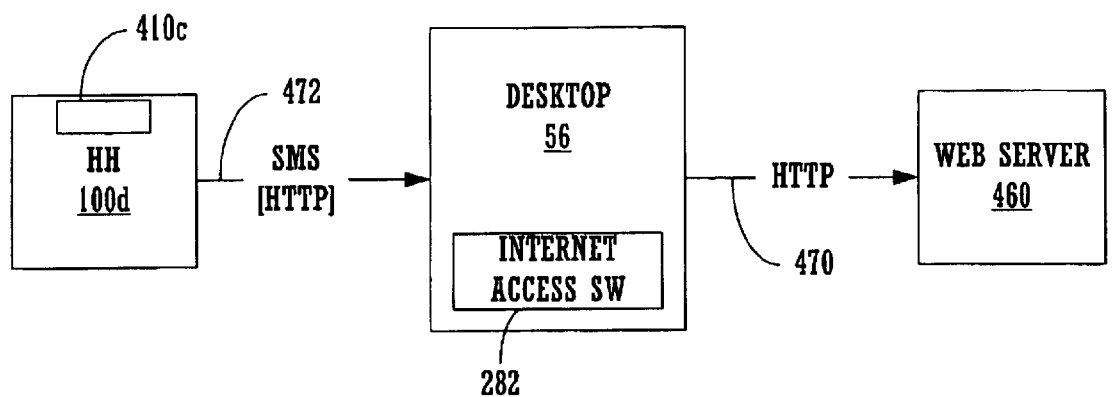
FIG. 9A is an illustration of an implementation of the present invention having an email transport encapsulated using a native hot sync transport mechanism.

FIG. 9A and FIG. 9B utilize another example of providing web content access support to a device 100d that does not have any natively. FIG. 9A illustrates a palmtop computer 100d coupled to the desktop 56 using an short message service (SMS) connection link 472. The desktop 56 is then connected to a web content server 460 located on the Internet or on an Intranet. This may occur using Internet access software 282. As shown in FIG. 9B, the corresponding system registry 410c utilizes the SMS helper code for both SMS itself 440f and for HTTP 440d. This means that the SMS programs will be used to process any URL request from an application residing on the device 100d that involves SMS or HTTP (the SMS helper code could also be extended to process FTP URLs alternatively or in addition to HTTP or web based Email URLs).

When an Internet application residing on the device 100d requests a URL such as "http:///myemailaccount.com," (e.g. some web based content) the request is then passed to an SMS URL handler. Since the SMS code does not have native support for a web based content request, it encapsulates this in a packet to be delivered to the desktop or server using SMS, as shown in 472 of FIG. 9A. When the user performs wireless SMS communication with their device, the request is sent to the desktop conduit. The conduit then examines the request and sees the web based URL. The conduit will then process the web based URL which may cause a communication to the web based server 460. The desktop 56 then may send the results back to the device 100d encapsulated in another SMS packet. On the device 100d, the encapsulated result is unwrapped and a web based communication is returned to the calling application.

The result is that a device without native support for web based content access (e.g., email) or web access in general was able to handle a standard URL request.

Figure 10A:
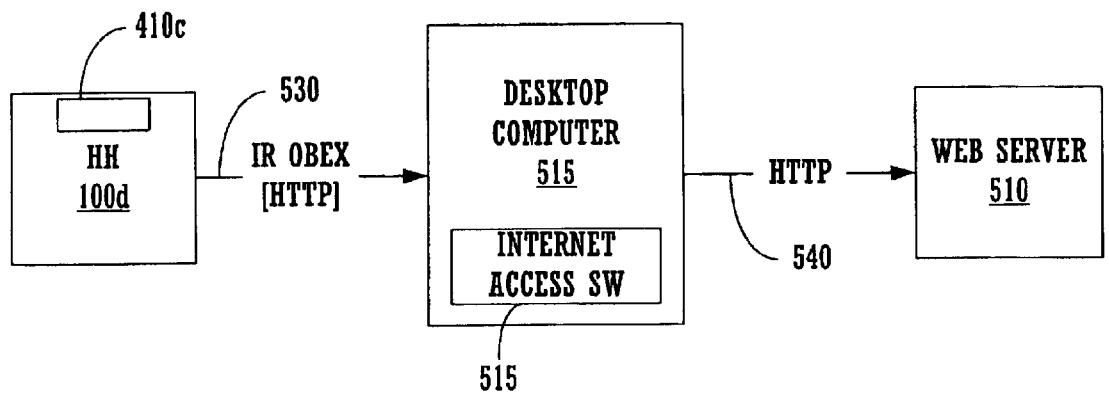
FIG. 10A is an illustration of an implementation of the present invention having an http transport encapsulated using a native bluetooth transport mechanism.

FIG. 10A and FIG. 10B utilize an IR example for providing http support for a device 100d. FIG. 10A illustrates a palmtop computer 100d coupled to a desktop computer 515, using an IR wireless communication link 530 (e.g., OBEX infrared). The computer 515 is then connected to an web server 510 located on the Internet. As shown in FIG. 10B, the corresponding system registry 410d utilizes the IR helper code for both IR 440b and also for http 440d. This means that the IR programs will be used to process any URL request from an application residing on the device 100d that involves http or IR (and could be extended to process FTP URLs).

When an Internet application residing on the device 100d requests a URL such as "http://myserver.com/index.html," the request is then passed to an IR URL handler. Since the IR code does not have native support for an http request, it encapsulates this in a packet to be delivered to the desktop computer 515, as shown in 530 of FIG. 10A. The computer 515 then examines the request and sees the http URL. The software on the computer 515 will then process the http URL which may cause a communication 540 to the http server 510. This may involve Internet access software 520. The computer 515 may then send the results back to the device 100d encapsulated in another IR packet. On the device 100d, the encapsulated result is unwrapped and an http communication is returned to the calling application.

The result is that a device without http native support or web access was able to handle a standard HTTP URL request.

As one more example, the email communication service could be also be used as a proxy to perform communication involving an HTTP URL. This example can operate similar to that of FIG. 10A and FIG. 10B except email is substituted for IR in the description. The result is that a device without http native support or web access was able to handle a standard HTTP URL request using email.

Figure 11:
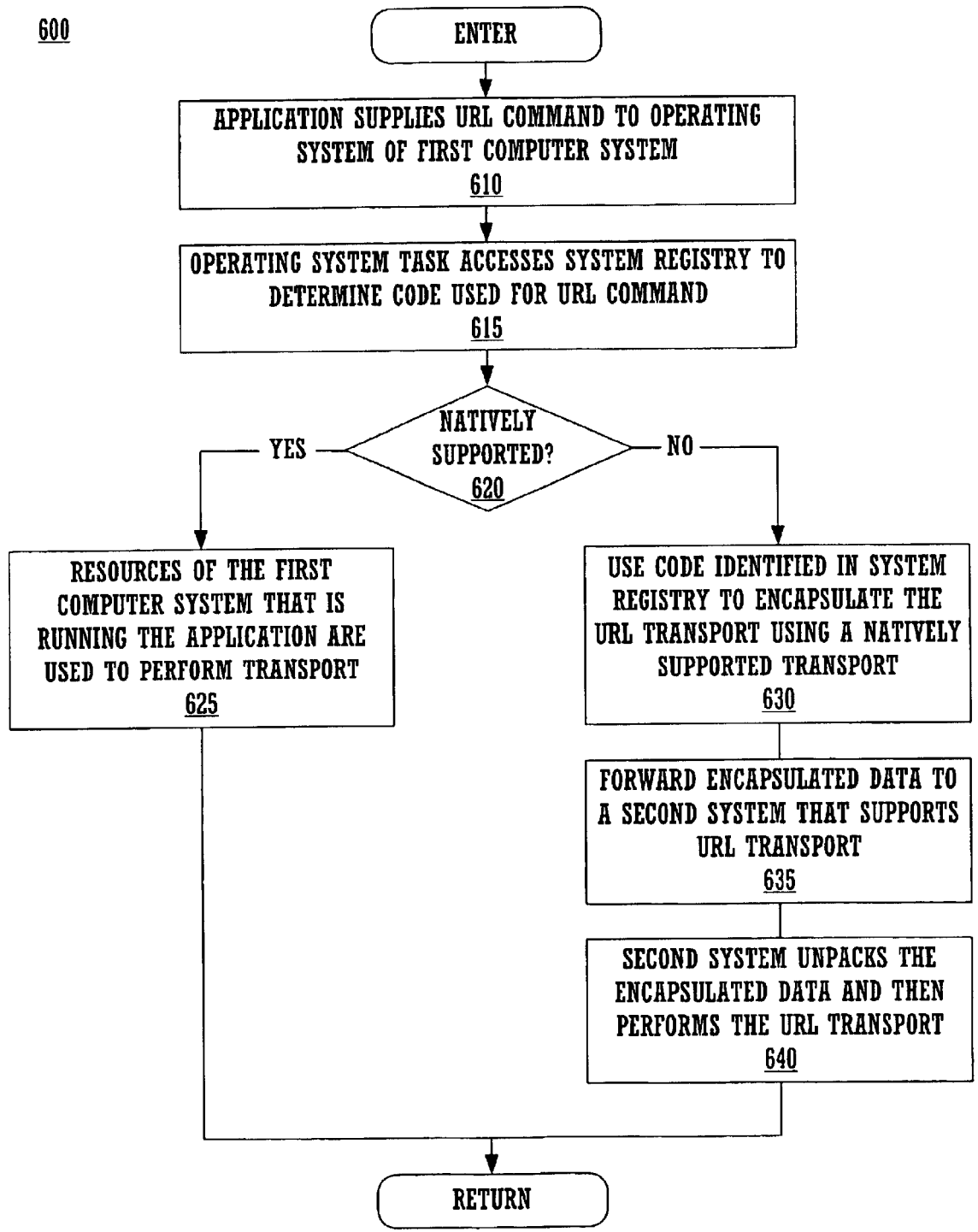
FIG. 11 is a flow diagram of a process in accordance with one embodiment of the present invention.

FIG. 11 illustrates a computer implemented process 600 in accordance with an embodiment of the present invention for realizing URL scheme proxies. Process 600 may be implemented as computer code stored in memory of device 100 and executed by a processor. At step 610, an application resident on the device 100 supplies requests a URL, e.g., by a command to the operating system resident on the device 100 ("the first computer system").

At step 615, an operating system task receives the URL request from the application and indexes the system registry to determine which helper code to use to process the URL request. The index is performed based on the scheme identified in the URL request. At this point, the operating system is using the system registry to determine which helper code to use to process the URL request. At step 620, if the helper code provides native support for the URL request, then step 625 is entered, otherwise step 630 is entered. At step 625, the native helper code uses the resources located on device 100d to directly perform the communication to satisfy the URL request. For instance, a web browser resident on the device 100d is used to request an http URL scheme.

At step 630, a URL scheme proxy is required to satisfy the original URL request from the application. The device 100d uses the helper code identified in the system registry to encapsulate the original URL request using a natively supported transport. For instance, if http was not supported natively by device 100d, then the operating system at step 630 would encapsulate the http request in a hotsync transport which is supported natively.

At step 635 of FIG. 11, the operating system then forwards the encapsulated data from device 100d to a second computer system or server system that supports the original URL request. It is appreciated that step 630 and 635 may be implemented by the helper code specified by the system registry. At step 640, the operating system then unpacks the encapsulated communication and retrieves the original URL request and processes it. By processing the URL request, at step 640, a response may then be generated back to device 100d. After unpacking the response, it is given to the application. The entire URL request processing process is therefore transparent to the application.

The preferred embodiment of the present invention, a method and system for expanding the URL schemes supported by a computer using URL scheme proxies, is thus described. While the present invention has been described in particular embodiments, it should be appreciated that the present invention should not be construed as limited by such embodiments, but rather construed according to the below claims.

What is claimed is:

1. A communication system comprising:
    a first computer system comprising a processor coupled to a bus, a memory coupled to a bus and wherein said memory comprises an application program and a system registry, said system registry having registered therein information regarding a plurality of URL schemes and associated helper code for implementing URL schemes and wherein a first URL scheme is natively implemented and wherein a second URL scheme is implemented by proxy; and
    a second computer system communicatively coupled to said first computer system and for receiving first information forwarded from said first computer system, said first information being of said first URL scheme and having encapsulated therein second information being of said second URL scheme and wherein said second computer system recognizes and processes said second information natively.

2. A communication system as described in claim 1 wherein said first computer system is a personal digital assistant.

3. A communication system as described in claim 1 wherein said first URL scheme is a hot sync scheme.

4. A communication system as described in claim 3 wherein said second URL scheme is an http scheme.

5. A communication system as described in claim 3 wherein said second URL scheme is an email scheme.

6. A communication system as described in claim 1 wherein said first URL scheme is an http scheme and wherein said second URL scheme is an ftp scheme.

7. A communication method comprising the steps of:
    a) maintaining, in a first device, a system registry having registered therein information regarding a plurality of URL schemes and associated helper code for implementing each registered URL scheme and wherein a first URL scheme is natively implemented and wherein a second URL scheme is implemented by proxy;
    b) an application of said first device requesting a communication of said second URL scheme;
    c) in response to step b), indexing said system registry to determine that said first URL scheme is a proxy for said second URL scheme;
    d) encapsulating said communication of said second URL scheme into a proxy communication of said first URL scheme; and
    e) forwarding said proxy communication to a second device that natively implements said second URL scheme.

8. A method as described in claim 7 further comprising the steps of:
    f) said second device receiving and unpacking said proxy communication to obtain said communication of said second URL scheme;
    g) said second device processing said communication of said second URL scheme; and
    h) said second device generating a response to said first device, said response being encapsulated into a communication of said first URL scheme.

9. A method as described in claim 7 wherein said first device is a personal digital assistant.

10. A method as described in claim 9 wherein said second device is a web hosted server.

11. A method as described in claim 7 wherein said first URL scheme is a hot sync scheme.

12. A method as described in claim 11 wherein said second URL scheme is an http scheme.

13. A method as described in claim 11 wherein said second URL scheme is an email scheme.

14. A method as described in claim 7 wherein said first URL scheme is an http scheme and wherein said second URL scheme is an ftp scheme.

15. A computer system having a processor and a memory unit and comprising:
    a memory resident system registry having registered therein information regarding a plurality of URL schemes and associated helper code for implementing URL schemes and wherein a first URL scheme is natively implemented and wherein a second URL scheme is implemented by proxy, said proxy being said first URL scheme;
    an application for requesting a communication of said second URL scheme; and
    a system task for indexing said system registry in response to said request and for determining that said first URL scheme is a proxy for said second URL scheme;

said system task also for encapsulating said communication of said second URL scheme into a proxy communication of said first URL scheme; and said system task also for forwarding said proxy communication to a second device that natively implements said second URL scheme.

16. A computer system as described in claim 15 wherein said second device is for receiving and unpacking said proxy communication to obtain said communication of said second URL scheme;

said second device for processing said communication; and said second device for generating a response to said first device, said response being encapsulated into a communication of said first URL scheme.

17. A computer system as described in claim 15 wherein said first device is a personal digital assistant.

18. A computer system as described in claim 17 wherein said second device is a web hosted server.

19. A computer system as described in claim 15 wherein said first URL scheme is a hot sync scheme.

20. A computer system as described in claim 19 wherein said second URL scheme is an http scheme.

21. A computer system as described in claim 19 wherein said second URL scheme is an email scheme.

22. A computer system as described in claim 15 wherein said first URL scheme is an http scheme and wherein said second URL scheme is an ftp scheme.

* * * * *